United States Patent
Latorre et al.

(10) Patent No.: US 7,313,675 B2
(45) Date of Patent: Dec. 25, 2007

(54) REGISTER ALLOCATION TECHNIQUE

(75) Inventors: Fernando Latorre, Huesca (ES); José González, Terrassa (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 11/155,755

(22) Filed: Jun. 16, 2005

(65) Prior Publication Data

US 2007/0005939 A1    Jan. 4, 2007

(51) Int. Cl.
*G06F 9/38* (2006.01)
(52) U.S. Cl. .................... 712/216; 712/216
(58) Field of Classification Search ........... 712/217, 712/216

See application file for complete search history.

(56) References Cited

OTHER PUBLICATIONS

Collins et al., "Clustered Multithreaded Architectures—Pursuing both IPC and Cycle Time", Proceedings of the 18th Annual Parallel and Distributed Processing Symposium, IEEE, Apr. 26-30, 2004, 10 pages.*
Canal et al., "Dynamic Code Partitioning for Clustered Architectures", International Journal of Parellel Programming, Springer Netherlands, vol. 29, No. 1, Feb. 2001, pp. 59-79.*
Canal et al., "Dynamic Cluster Assignment Mechanisms", Proceedings of the 6th International Symposium on High Performance Computer Architecture, IEEE, Jan. 8-12, 2000, 10 pages.*

* cited by examiner

*Primary Examiner*—William M. Treat
(74) *Attorney, Agent, or Firm*—Trop, Pruner & Hu, P.C.

(57) ABSTRACT

A technique for allocating register resources within a microprocessor. More particularly, embodiments of the invention pertain to a register allocation technique within a microprocessor for multiple-threads of instructions or groups of micro-operations ("uops").

21 Claims, 6 Drawing Sheets

REGISTER ALLOCATION TECHNIQUE

FIELD

Embodiments of the invention relate to microprocessor architecture. More particularly, embodiments of the invention relate to a technique for sharing register resources within a microprocessor.

BACKGROUND

In typical high-performance, superscalar microprocessors, one technique to improve performance is register renaming, in which logical registers referred to by instructions are mapped onto a larger set of physical registers. Mapping physical register to logical registers helps eliminate false dependencies that would exist in the logical register mapping. Traditionally, structures such as a register alias table (RAT) store the logical-to-physical mappings, whereas another structure, such as a freelist table ("freelist"), would hold the unused or "free" physical registers until they are allocated and used by the rename unit.

In multi-threaded processors, for example, which have the ability to execute several instruction streams ("threads") concurrently, a technique for allocating physical registers from the freelist may use either a hard-partitioned freelist or shared one. A shared freelist technique usually requires a larger freelist table and associated logic but has a performance advantage of having all of the registers within the freelist available for one active thread if the processor is running in single-thread mode. A hard-partitioned freelist technique requires less hardware but can constrain performance, because the number of registers per thread is fixed.

An example of a prior art shared register allocation technique for a two-threaded processor is illustrated in FIG. 1. When a register is allocated for either or both threads, it is read from the freelist 105 and written into the appropriate RAT 110 as a renamed register. Furthermore, a separate structure such as a re-order buffer (ROB) 115 tracks allocated registers so that they can be returned to the freelist when no longer needed.

One short-coming of the prior art shared register allocation technique illustrated in FIG. 1 is the fact that one thread or other group of instructions or micro-operations ("uops") may deprive other threads or uops from physical registers for periods of time, thereby preventing the other threads or groups of uops from completing tasks until more physical registers are available in the free list.

A prior art example of a partitioned register allocation technique is illustrated in FIG. 2. The partitioned register allocation technique of FIG. 2 allocates specific registers to specific threads or groups of uops, and this allocation does not change. Furthermore, if a thread or group of uops to which a group of registers has been assigned is dormant, the assigned registers are unused, wasting physical register space.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention pertain to microprocessor architecture. More particularly, embodiments of the invention pertain to a register allocation technique within a microprocessor for multiple-threads of instructions or other groups of instructions or micro-operations ("uops") that facilitates an optimal number of physical registers to be mapped to a desired number of logical registers for each of the threads or uop groups.

At least one embodiment of the invention allocates physical registers from a shared free list (SFL) to various private free lists (PFLs) corresponding to an instruction thread or other group of instructions or uops. After an instruction or uop is retired, one embodiment of the invention includes a mechanism to release any physical registers corresponding to the retired instruction or uop and update the SFL to indicate that a physical register released in response to the retired instruction or uop is once again available to be allocated to a PFL. Furthermore, in one embodiment, a starvation aware arbiter (SAA) sends uops to be performed by execution logic in a manner to prevent the execution logic from being deprived of uops to execute. In one embodiment, the execution logic, SFL, and SAA are shared by a number of front-end logic circuits, each corresponding to a particular thread or uop group. In other embodiments, execution logic, SFL, and/or SAA resources may be dedicated to a thread or group of threads or other group of uops.

Figure 1:
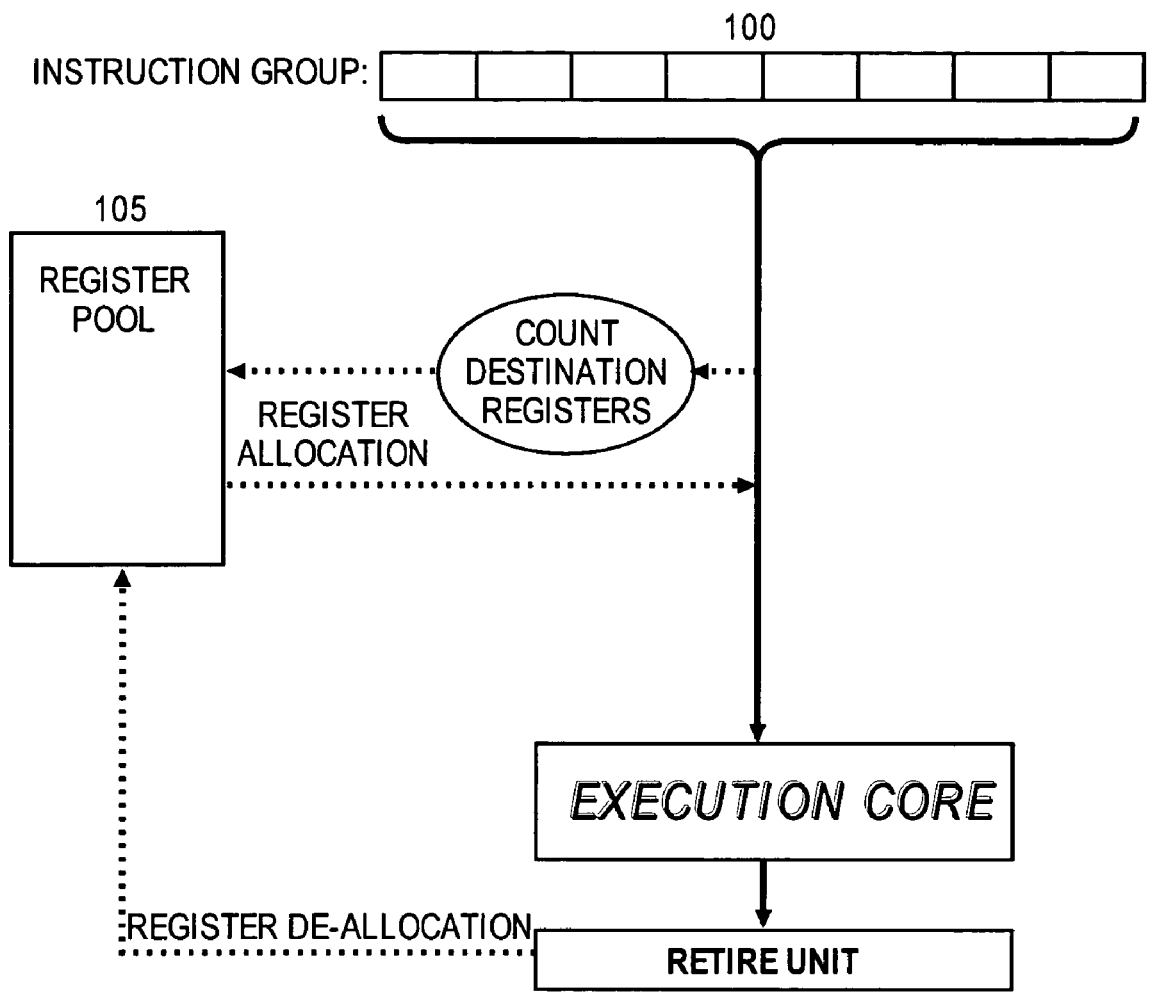
FIG. 1 illustrates a prior art register sharing technique for a multi-threaded processor that maximizes the freelist space available for a single thread.
Figure 2:
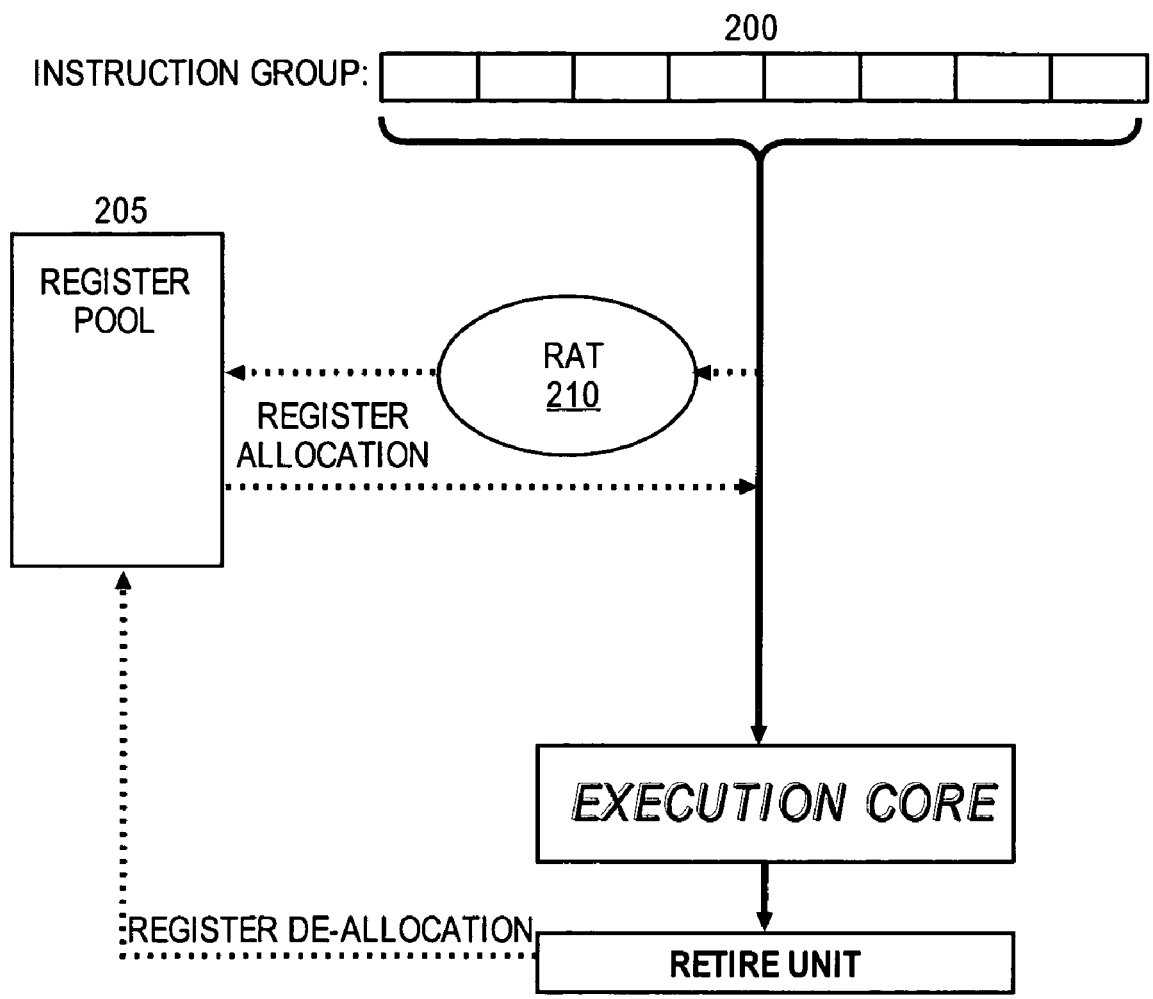
FIG. 2 illustrates a prior art register sharing technique that uses a partitioned free list.
Figure 3:
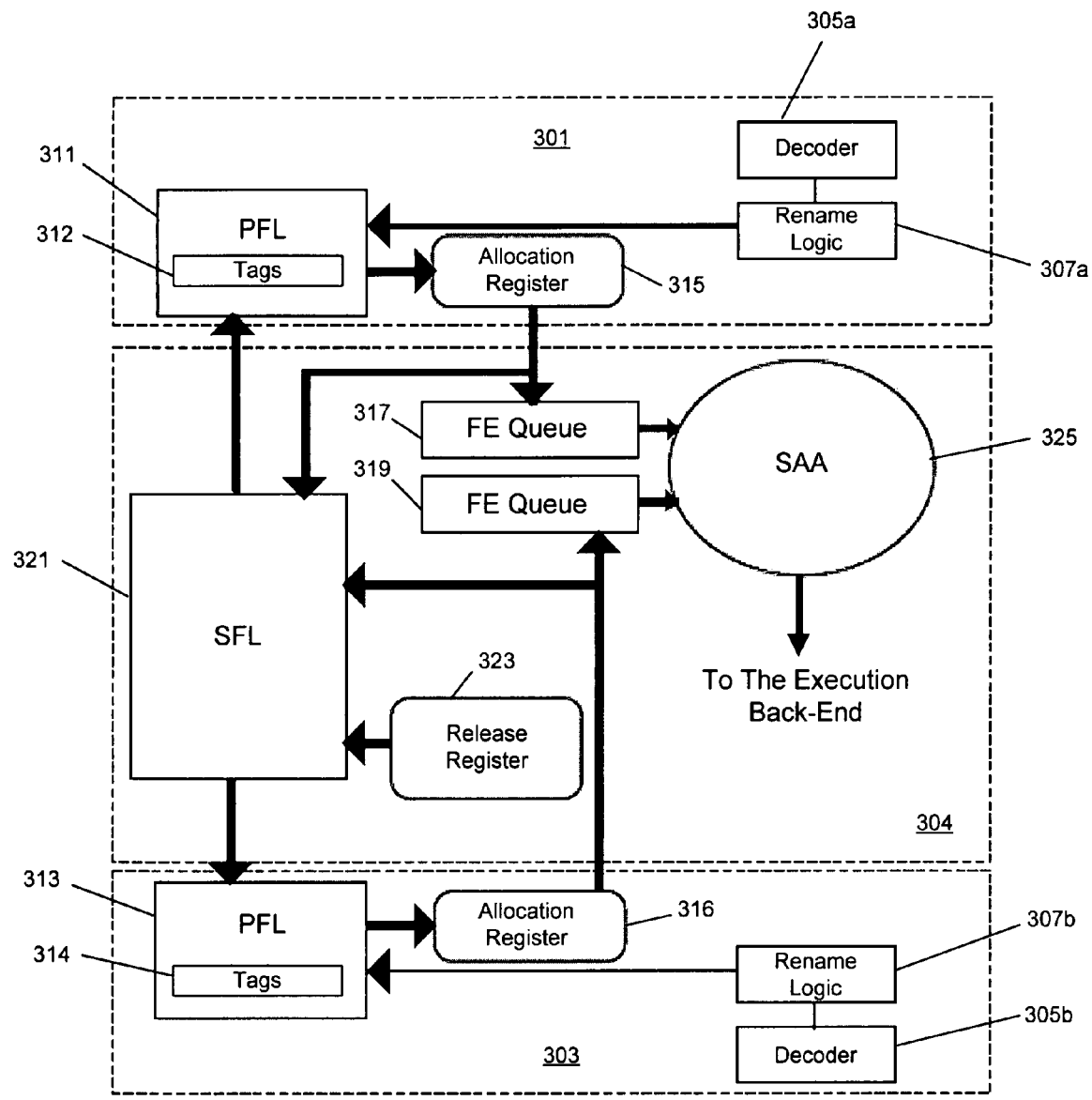
FIG. 3 illustrates portions of a microprocessor architecture in accordance with at least one embodiment of the invention.

FIG. 3 illustrates portions of a microprocessor architecture in accordance with one embodiment of the invention. Specifically, FIG. 3 illustrates three general portions of a microprocessor or processing system, including two "front end" portions 301 303 and a shared portion 304. In some embodiments, fewer or more front end portions may exist and communicate with the same or more shared portions. Each front end portion contains, among other things, a decoder 305a 305b to decode instructions into uops and a rename logic 309a 307b to map logical registers used by the instructions to physical registers. In one embodiment, the back end logic is shared by the front end portions, whereas in other embodiments, the back end logic is dedicated to a particular front end or front ends.

In one embodiment of the invention, the front end circuits also contain a PFL 311 313 that can be accessed by the rename circuit. The PFL may contain indicators, or "tags" 312 314, corresponding to a number of physical registers that are solely allocated for use by uops whose registers are renamed by a particular front end. For example, in one embodiment, each front end decodes uops, renames corresponding registers, and steers the uops from a particular thread of instructions. A "thread" is a term used to refer to a group of instructions or uops scheduled for execution by an operating system and corresponding to a particular context state of a processor. In other embodiments, instructions or uops decoded, renamed, steered by a particular front end may not be part of a thread. Also depicted in the front ends in FIG. 3 is a uop allocation register 315 316 that stores an indicator, or tag, of the physical register to be mapped to a corresponding logical register. In one embodiment the tags stored in the PFL and in the allocation register may be an address or portion of an address of a physical register, whereas in other embodiments the tag may be some other indicator of a physical register or registers.

After a particular physical register tag has been stored in the uop allocation register, the uop and the corresponding allocated physical register tag are stored in one of a number of front end queues 317 319, each of which corresponding to a particular front end. In other embodiments, in which more or fewer front ends exist than those depicted in FIG. 3, a corresponding number of front end queues may be used. Alternatively, the same front end queue, such as a partitioned front end queue, may be used for uops allocated from various front ends in other embodiments.

In parallel with storing the uop within the front-end queue, an indication can be made to the SFL 321 that a particular physical register has been allocated to a uop, and thus removed from the PFL, so that the SFL may respond by allocating a replacement physical register to the PFL from which the physical register corresponding to the uop was used. In one embodiment, the indication to the SFL is the physical register tag stored in the uop allocation register, whereas in other embodiments other indications may be used. In one embodiment, the SFL responds to the indication of a used PFL physical register by replacing it with a physical register, whose tag is currently stored in the SFL. Because the SFL only contains tags of physical registers that are currently not in use, the SFL may allocate any one of the physical registers whose tags are stored therein to any one of the PFLs. In one embodiment, the SFL stores the list of free physical registers in a queue, such as a first-in-first-out (FIFO) queue and allocates, or "pops", the next tag from the queue to allocate to a PFL.

After the SFL allocates a particular physical register to a PFL, it may de-allocate the physical register from its list and replace the corresponding entry with a new physical register tag, such as one that has become free due to an earlier retired instruction. In any case, when a physical register becomes free, its tag can be stored into the SFL, in one embodiment, without having to wait for an SFL entry to become available. A uop release register 323 is illustrated in FIG. 3, which can be used to store tags of physical registers that are not in use by a uop. For example, in one embodiment, the uop release register may store a tag, pointer, or other indicator of a physical register that is to be included in the SFL as a result of one or more uops being retired.

Alternatively, in some embodiments, the architectural state stored in an allocated physical register or registers may be committed by assigning a pointer to the physical register or registers containing the architectural state to be committed. Accordingly, other physical registers than those storing the architecture state to be committed may be indicated by a tag in the uop release register. In one embodiment, the uop release register contains a tag or tags of physical registers that do not store information to be committed to architectural state or are not indicated by a pointer as containing information to be committed to architectural state.

Also illustrated in FIG. 3 is a logic circuit or software program that determines the uops to be executed by back end execution logic. In one embodiment, this circuit or software is a starvation aware arbiter (SAA) 325, which can access uops from the front end queues and allocate the uops to back end execution logic according to some arbitration algorithm or scheme. In one embodiment, the SAA allocates uops to execution logic according to a "first come, first serve" algorithm, whereas in other embodiments, the SAA may implement a more complex algorithm. For example, in one embodiment, the SAA allocates uops to be executed by back end execution logic based on the relative processing bandwidth of the execution logic at a particular time and the resource requirements of a uop to be executed, such that the execution logic will not be idle, or "starved", for more than certain a period of time. Any number of algorithms may be used by the SAA, however.

Figure 4:
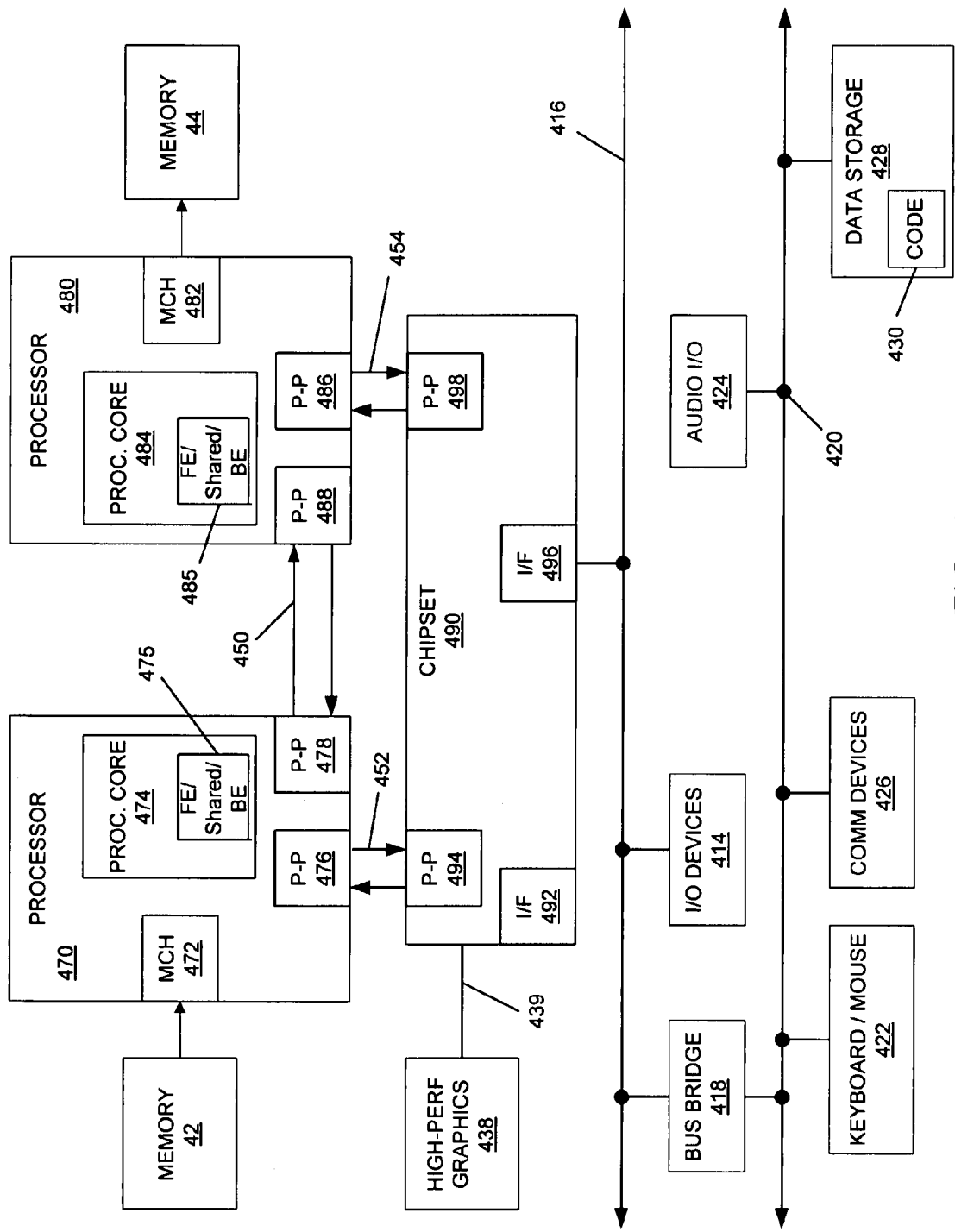
FIG. 4 illustrates a point-to-point computer system in which at least one embodiment of the invention may be used.

FIG. 4 illustrates a point-to-point (PtP) computer system in which one embodiment may be used. In particular, FIG. 4 shows a system where processors, memory, and input/output devices are interconnected by a number of point-to-point interfaces.

The system of FIG. 4 may also include several processors, of which only two, processors 470, 480 are shown for clarity. Processors 470, 480 may each include a local memory controller hub (MCH) 472, 482 to connect with memory 22, 24. Processors 470, 480 may exchange data via a point-to-point (PtP) interface 450 using PtP interface circuits 478, 488. Processors 470, 480 may each exchange data with a chipset 490 via individual PtP interfaces 452, 454 using point to point interface circuits 476, 494, 486, 498. Chipset 490 may also exchange data with a high-performance graphics circuit 438 via a high-performance graphics interface 439.

At least one embodiment 475 485 of the invention may be located within processing cores within each of the PtP bus agents of FIG. 4. and more specifically in the front end, shared and back end portions as shown in FIG. 3. Other embodiments of the invention, however, may exist in other circuits, logic units, or devices within the system of FIG. 4. Furthermore, other embodiments of the invention may be distributed throughout several circuits, logic units, or devices illustrated in FIG. 4.

Figure 5:
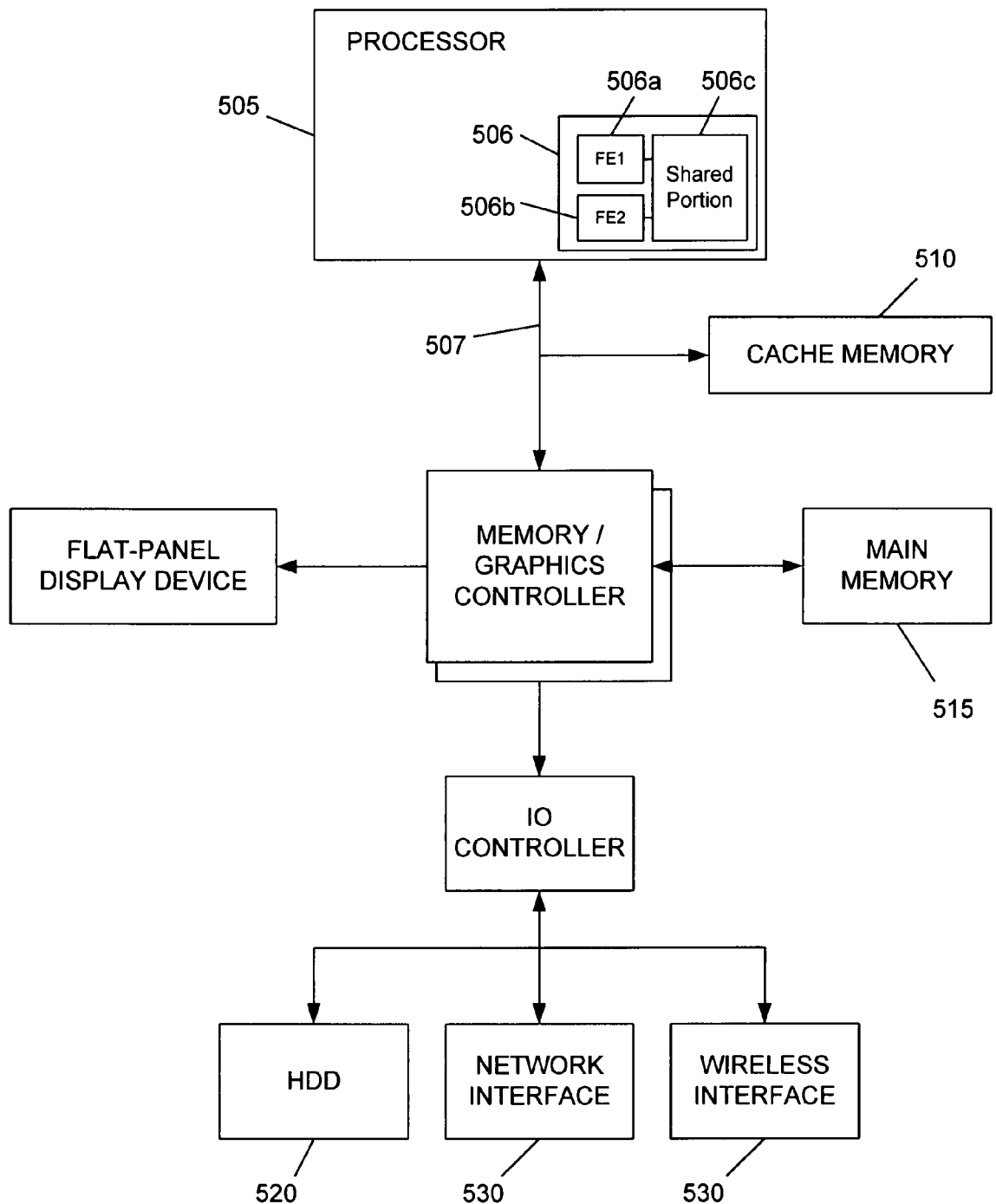
FIG. 5 illustrates a shared bus computer system in which at least one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache, which comprise an inclusive cache hierarchy in which coherency data is shared between the L1 and L2 caches. In other embodiments there may be more than 1 cache hierarchy.

Illustrated within the processor of FIG. 5 is one embodiment of the invention 506. More specifically, embodiment 506 includes a pair of front end portions 506a and 506b, along with a shared portion 506c, such as shown in FIG. 3. Other embodiments of the invention, however, may be implemented within other devices within the system, such as the graphics controller, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507. Furthermore, the cache memory may contain relatively fast memory cells, such as a six-transistor (6 T) cell, or other memory cell of approximately equal or faster access speed. Within, or at least associated with, each bus agent is at least one embodiment of invention 506, such that store operations can be facilitated in an expeditious manner between the bus agents.

Figure 6:
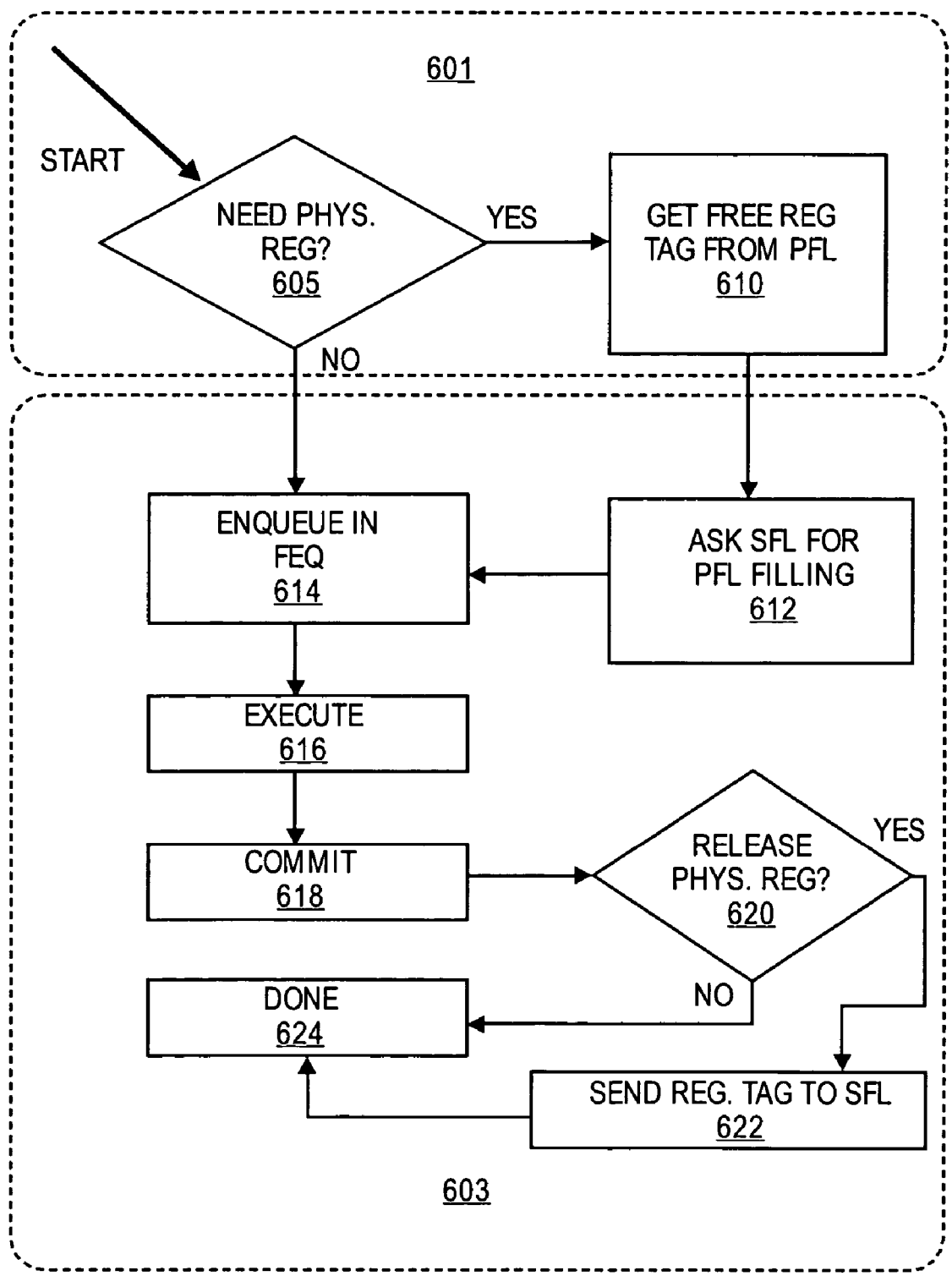
FIG. 6 is flow diagram illustrating a register allocation technique according to one embodiment of the invention.

FIG. 6 is a flow diagram illustrating operations used in conjunction with carrying out at least one embodiment of the invention. Particularly, the flow diagram of FIG. 6 illustrates operations that may be divided according to the portion of a processor responsible for performing the operations. For example, the flow diagram of FIG. 6 illustrates some operations 601 that are to be performed by front-end processor logic described above in reference to FIG. 5, whereas other operations 603 illustrated in FIG. 6 are to be performed by back-end execution logic. In other embodiments, the operations illustrated in FIG. 6 may be performed by other portions of a processor, software program, or some combination thereof.

At operation 605 it is determined whether a physical register needs to be allocated to a uop. If so, the physical register is allocated from a PFL at operation 610 and a replacement physical register tag is requested from the SFL at operation 612. In some embodiments, a replacement register may be requested from the SFL periodically, such as once per clock cycle or after some number of clock cycles. In other embodiments, a replacement register may be requested whenever a certain number of registers have been allocated from a PFL. If the uop does not require a physical register, the uop is stored in a front end queue at operation 614 without an allocated physical register tag. The uop is executed by back-end execution logic at operation 616 and the architectural state resulting therefrom is committed at operation 618 and the uop is retired. If the physical register(s) is/are released at operation 620 after the executed uop is retired, then physical register(s) tag(s) is/are stored into the SFL at operation 622, to the extent there is room in the SFL. Otherwise, the process ends at operation 624.

The size of the PFL and/or SFL can be application dependent, in some embodiments. For example, the size of the PFL and SFL can be subject to the die area, performance, and power constraints of a particular application. However, the principals described herein with regard to various embodiments of the invention are not limited to a particular PFL or SFL size.

Various aspects of embodiments of the invention may be implemented using complimentary metal-oxide-semiconductor (CMOS) circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
    a first private free list (PFL) of physical registers of a first front end portion of the apparatus to be mapped to a first plurality of logical registers of a first instruction thread;
    a second PFL of physical registers of a second physical register of a second front end portion of the apparatus to be mapped to a second plurality of logical registers of a second instruction thread;
    a shared free list (SFL) of physical registers of a shared portion of the apparatus to be allocated to the first or second PFL in response to a physical register of the first or second PFL being mapped to any of the first or second plurality of logical registers, respectively.

2. The apparatus of claim 1 further comprising a micro-operation (uop) release register to store an indication of released physical registers that are to be included in the SFL in response to a uop being retired.

3. The apparatus of claim 2 further comprising a starvation aware arbiter (SAA) to issue uops for execution according to an algorithm that is to prevent execution logic from remaining idle longer than a certain period of time.

4. The apparatus of claim 1 further comprising at least one uop allocation register to store a uop and corresponding physical register tags allocated from one of the first or second PFLs.

5. The apparatus of claim 3 further comprising at least one queue to store a list of uops to be issued by the SAA.

6. The apparatus of claim 1, wherein information of the first private free list (PFL) is private from information of the second PFL.

7. A processor comprising:
    a first front-end logic including a first private free list (PFL) of physical registers corresponding to a first set of micro-operations (uops), and to determine whether one of the physical registers needs to be allocated to one of the first set of uops and if so to allocate the physical register to the uop and to request a replacement physical register from a shared free list;
    a second front-end logic including a second PFL of physical registers corresponding to a second set of uops;
    the shared free list (SFL) of physical registers to be allocated to either the first or second PFL;
    a back-end execution logic to execute the first and second set of uops.

8. The processor of claim 7 wherein the first and second front-end logic further comprises a first and second decoder to decode a first and second set of instructions into the first and second set of uops, respectively.

9. The processor of claim 8 wherein the first and second front-end logic further comprises a first and second rename logic to map a first and second set of logical registers corresponding to the first and second set of uops to the first and second PFL of physical registers, respectively.

10. The processor of claim 9 further comprising a starvation aware arbiter (SAA) to issue the first and second set of uops to the back-end execution logic.

11. The processor of claim 7 wherein the first and second PFL and the SFL each comprise a plurality of entries to store a plurality of address portions ("tags") corresponding to a plurality of physical registers.

12. The processor of claim 11 further comprising a uop release register to store an indication of a first physical register whose tag is to be stored within the SFL after a uop is retired.

13. The processor of claim 12 wherein the first set of uops corresponds to a first instruction thread and the second set of uops corresponds to a second instruction thread.

14. The processor of claim 7 wherein physical registers from the SFL are to be allocated to the first and second PFLs in response to a physical register within one of the first and second PFLs being mapped to a logical register of the first or second set of uops.

15. The processor of claim 7, wherein the second front-end logic is to determine whether one of the physical registers needs to be allocated to one of the second set of uops and if so to allocate the physical register to the uop and to request a replacement physical register from the shared free list.

16. A method comprising:
- determining whether a physical register needs to be allocated to a uop;
- allocating the physical register from a first list of physical registers if a physical register needs to be allocated to the uop;
- requesting a replacement physical register for the first list of physical registers from a second list of physical registers.

17. The method of claim 16 further comprising storing the uop within a front-end queue from which the uop is to be issued to execution logic to perform the uop.

18. The method of claim 17 further comprising performing the uop and committing the architectural state resulting therefrom.

19. The method of claim 18 further comprising releasing physical registers corresponding to the uop after the uop has been retired and re-allocating the released physical registers into the second list of physical registers.

20. The method of claim 19 wherein the first list of physical registers corresponds only to a first instruction thread.

21. The method of claim 20 wherein the uop is to be issued to the execution logic according to algorithm that prevents the execution from remaining idle for more than a first period of time.

* * * * *